United States Patent

[11] 3,601,312

[72] Inventor Orval R. Feather
2464 Bunker Hill, Ann Arbor, Mich. 48105
[21] Appl. No. 819,625
[22] Filed Apr. 28, 1969
[45] Patented Aug. 24, 1971

[54] METHOD OF INCREASING THE LIKELIHOOD OF PRECIPITATION BY THE ARTIFICIAL INTRODUCTION OF SEA WATER VAPOR INTO THE ATMOSPHERE WINDWARD OF AN AIR LIFT REGION
7 Claims, 3 Drawing Figs.

[52] U.S. Cl. .................................................. 239/2, 239/14
[51] Int. Cl. .................................................. A01g 15/00
[50] Field of Search .................................................. 239/2, 14

[56] References Cited
UNITED STATES PATENTS
3,135,466  6/1964  Reid .............................. 239/2 X
3,409,220  11/1968  Black .......................... 239/2

Primary Examiner—Lloyd L. King
Assistant Examiner—John J. Love
Attorney—Beaman & Beaman ABSTRACT: The invention pertains to a method of producing fresh water utilizing modification of air mass conditions by injecting sea water into solar-heated air to evaporate sea water into the atmosphere and increase the air water vapor content, and thereby greatly increase the capacity of the so modified air mass for absorbing the available radiant energy for warming the air by solar and terrestial radiant energy to increase the ability of the air to absorb increased quantities of water vapor and ambient temperature, and thereafter lift the treated air to sufficient altitudes to produce convective instability, cumuliform clouds and precipitation. Preferably, the injection of sea water into the atmosphere, and the solar heating thereof, occur at alternate land areas disposed windwardly of a mountain or other natural orographic barrier wherein the treated air is lifted orographically.

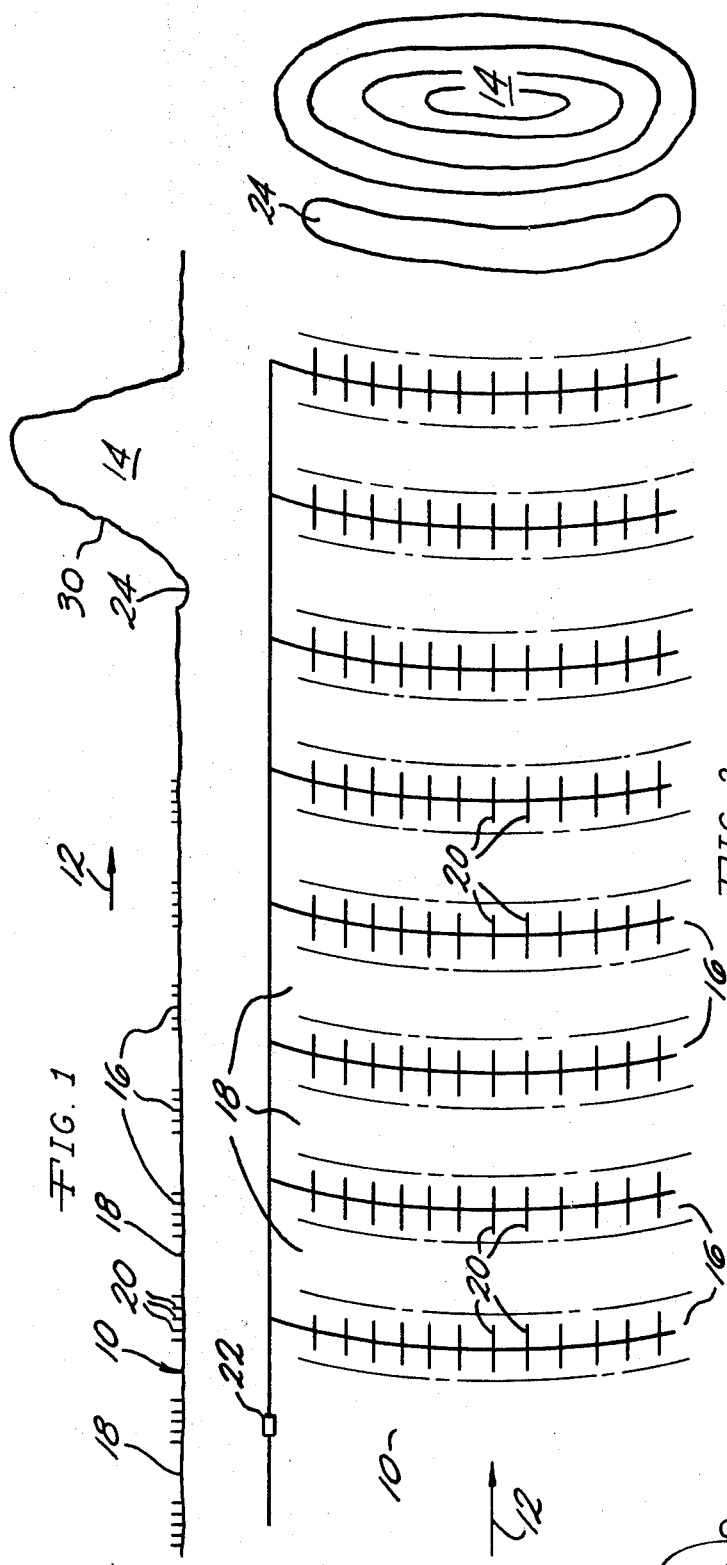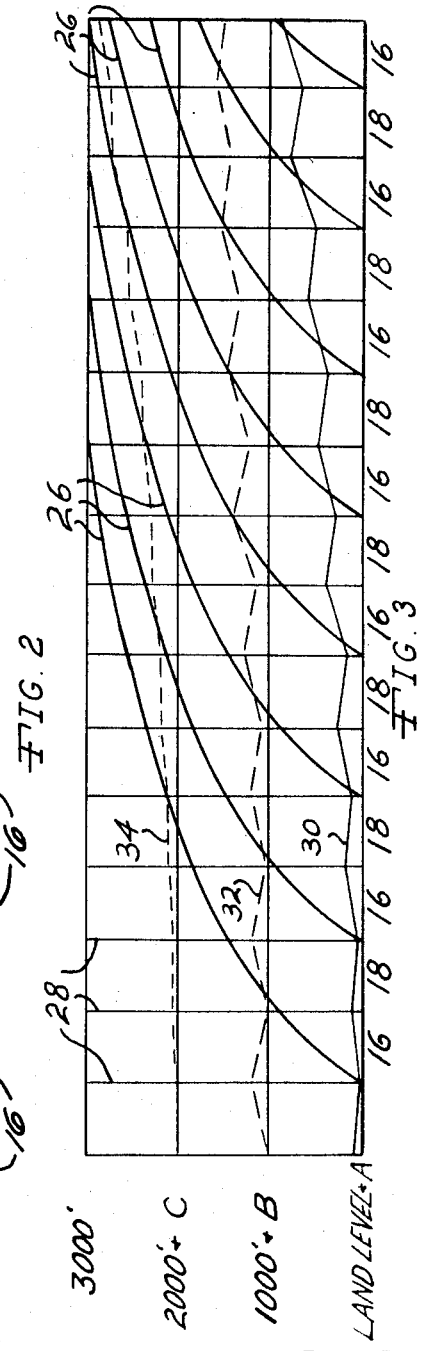
PATENTED AUG 24 1971
3,601,312
INVENTOR
ORVAL R. FEATHER
BY Beaman Beaman
ATTORNEYS 3,601,312

METHOD OF INCREASING THE LIKELIHOOD OF PRECIPITATION BY THE ARTIFICAL INTRODUCTION OF SEA WATER VAPOR INTO THE ATMOSPHERE WINDWARD OF AN AIR LIFT REGION

BACKGROUND OF THE INVENTION

The invention pertains to the art of modifying weather by the forced evaporation of sea water into the air, and recovering fresh water therefrom by inducing precipitation.

It has been previously proposed to increase the likelihood of precipitation by injecting sea or fresh water into the air that the moisture content of the air be increased. U.S. Pat. Nos. 2,776,167 and 3,135,466 are directed to apparatus of this type. However, the mere concept of injecting moisture into the air in order to increase the likelihood of precipitation is not likely to meet with success in that there are a number of meteorological parameters and characteristics which, in combination, need to be present before the desired precipitation will occur. One important air mass property, convective instability, is a recognized prerequisite to inducing convective precipitation. Convective instability cannot occur unless some satisfactory means for increasing the equivalent potential temperature of one air mass over that of a surrounding air mass is achieved. The novel technique proposed herein provides the means for selectively increasing the equivalent potential temperature of one air mass relative to the air mass surrounding the first air mass. None of the prior art provides the means for so increasing the equivalent potential temperature of an air mass by reason of the fact that the evaporation process is characteristically a constant equivalent potential temperature or isentropic process. Also, the location of the desired precipitation in methods and systems proposed by the prior art is not readily predictable, and it is possible that rainfall if so produced, would fall at locations which were not particularly in need of water.

The conditions required to produce rain are characteristically very complicated and not yet fully understood even by meteorological experts. However, it is known that certain basic conditions need not to be present, and with the apparatus and methods of the prior art the rather haphazard introduction of water vapor, even over vast areas, into the atmosphere has not resulted in weather modification that can be readily utilized in a beneficial manner. For instance, in previous attempts to produce weather modification by introducing water into the air, the location of the water introduction could not be so located near a source of orographic lift whereby maximum utilization of the water vapor laden air could be achieved.

In order to induce precipitation by injecting moisture into the air to increase the water vapor content thereof, it is also necessary to have certain conditions present to accompany the introduction of water vapor into the atmosphere. For instance, sufficient solar heat is necessary as the prime source of energy required wherein sufficient solar heat is available to raise the moisture absorption level of the atmosphere into which the sea water is being introduced. Also, it is necessary that certain prevailing wind characteristics be present wherein the wind predominately moves in a given direction at a relatively low wind velocity. High wind velocities could cause sufficient moisture disbursement and diffusion as to negate the desired increase in moisture content of the atmosphere resulting from the injecting of moisture into the air. Also, a relatively high level of natural water vapor content should exist, though not critically necessary, in the air and the temperatures of the land over which the air is moving and air into which the water injection is occurring should be relatively high to optimize thermodynamic air mass properties for producing a markedly divergent angle between the dry and the saturated adiabatic lapse rates of the pseudoadiabatic energy diagram.

Another most important factor with respect to producing a successful weather modification program wherein the introduction of water vapor into the air by artificial means is required lies with the power requirement for introducing the water into the air. With the prior art devices it is intended that pumps, fans and the like be used to force the water into the air. In that it is necessary to introduce the water vapor into the air over a substantially large area, the power requirement, if manmade power is to be used, is tremendous, and is so great as to make successful weather modification programs using manmade power systems prohibitively expensive.

SUMMARY OF THE INVENTION

It is the purpose of the invention to provide a predesigned weather modification system, wherein fresh water may be obtained by precipitation, which includes the forced evaporation of sea water into the atmosphere to the maximum radiant energy absorption rate available and inducing the precipitation of fresh water from the atmosphere at a predetermined location. In the practice of the invention it is necessary that certain physical and natural requirements be met for the practice of the invention to become practical, and while the practice of the invention is not possible in all parts of the earth, for example in polar regions, there are a number of locations upon the earth wherein increased amounts of fresh water are urgently required, and wherein the requirements concerning geographical features and sufficient solar radiant energy flux densities are available.

Basically, the practice of the invention employs the use of existing solar energy in desert and other similar high solar energy regions for the evaporation of sea water forced sprayed from the earth's surface into the lower boundary layer of the atmosphere. The evaporated moisture retained by the lower atmosphere is transported by prevailing winds to a nearby mountain range, where it is orographically lifted and the desired water released as precipitation from resulting cumulous clouds and thunderstorms.

In order to be most effective, the introduction of the sea water into the air occurs at a plurality of spaced areas windward of the mountain range which provides the orographic lift. Alternating spray regions at which the sea water is introduced into the air and nonspraying regions are required wherein the air may be heated by solar and terrestial radiant energy to thereby increase the air's ability to absorb and retain additional water vapor such that a progressively increasing ability of the air to carry moisture occurs. For instance, alternate spraying band regions and nonspraying band regions of approximately 1 mile in width, though the two bands may be designed to be of different widths, may be located windward of the mountain range, and by using eight or 10 spraying and nonspraying regions, a progressive and incremental water absorption and heat absorption by the air occurs as the air moves towards the mountain or orographic lift elevation. The length of the band regions will be primarily determined by the shape and size of the mountain range available, and the bands will be located in a "parallel" or "concentric" relationship with each other and the available mountains.

Of course, a considerable amount of sea water must be sprayed into the air in order for the practice of the method to be fully utilized. To mechanically pump such amounts of water into the air would require a great deal of power, and for this reason the practice of the invention is most practical in those land areas which are significantly below sea level wherein water may be brought into the region in which the invention is to be practiced by aquaducts, pipelines or channels, and gravity is utilized to produce the desired water pressure for introducing the sea water into the air. In those regions where the land areas in which spraying occurs are significantly below sea level, such as more than 100 or 200 feet below sea level, greater water pressures than are absolutely necessary for spraying purposes would be available, and it is envisioned that hydroelectric power plants would be located as to utilize the hydraulic head available for producing large quantities of electric power. In that the practice of the invention will produce sea-salt residue, the presence of this residue, and the availability of cheap electric energy, will permit the production of chemicals and fertilizers using the constituents of sea-salt residue which may be electrically processed.

Additionally, it is necessary that the land region be such that clear skies of arid or other high-insolation local areas exist for providing solar heat of sufficient amounts to furnish the sufficient energy base to heat the air into which the moisture is and has been introduced. Another requirement for the region in which the invention is practiced is that there must be a relatively low characteristic prevailing wind toward the mountain range. Preferably, a prevailing wind between 5 and 15 miles an hour below the 3,000 to 5,000 feet altitude should be available, and in the higher atmospheric levels to 10,000 feet the prevailing wind velocity could be substantially higher.

It is also helpful, though not critically necessary, in the practice of the invention that an average quantity of natural water vapor content exist in the upper atmosphere above the arid region in order to provide moisture sustenance needed for sustained shower activity over an expanded period of time and to reduce the amount of water vapor that has to be introduced to the lower levels of the atmosphere. There are a number of locations in the world wherein this condition exists due to the fact that the prevailing wind, before passing over the arid or other region, passes over large bodies of water and, from natural evaporation, has a relatively high water content.

While it appears that orographic lift is the most practical means for providing the lifting of the air mass once treated, it is conceivable that by the use of thermal uplift conditions the air mass could be forced to rise to the level where precipitation would occur. In this respect, it may be possible to treat desert or arid regions in such a manner, such as by covering large portions of the desert surface with asphalt, other near-infrared heat absorbing and far-infrared radiating material, to produce a thermal updraft condition downwind from the spray region which could be used to lift the treated air and produce precipitation. However, the most practical and economical means for raising the treated air is through orographic lift.

In the practice of the inventive concept the spraying of the sea water into the air, the location at which spraying will occur and the other controllable variations will be under the regulation of a computer or other data assimilating and comparing apparatus and control systems for determining the optimum time and period of time for injecting the sea water into the air, and determining those locations and the extent to which injection should occur. It is envisioned that injection into the air will only occur during those times of the day at which the solar radiation is at its greatest, such as between 10 a.m. and 2 p.m., and the distance from the air treatment region to the mountain range will determine at which times precipitation will occur due to the treatment of the air in accord with the invention.

As previously mentioned, it is also envisioned that in the practice of the invention in those areas having a very high hydraulic head due to the areas being substantially below sea level, that hydroelectric generation stations could be utilized in conjunction with the water distribution system to create vast quantities of electricity, and this fact, in conjunction with the increase in fresh water and the associated availability of sea water salt precipitates which would be available in the previously arid region could make the previously unusable areas of the world productive, and capable of being effectively used for agriculture, chemical production and manufacturing, and the invention could be thus instrumental in reclaiming large land areas.

BRIEF DESCRIPTION OF THE DRAWING

The method of the invention is described in detail in the following description and the accompanying drawings wherein:

FIG. 1 is an elevational view of the spraying and nonspraying regions as utilized in conjunction with a mountain range of mountains or high hills, FIG. 2 is a plan view of the layout of the spraying and nonspraying regions in accord with the invention as shown in FIG. 1, and FIG. 3 is a graph indicating the distribution of the injected water vapor within the atmosphere occurring at the various spraying regions and also indicates various temperature and humidity conditions at the regions.

DESCRIPTION OF THE PREFERRED EMBODIMENT

Basically, the practice of the invention comprises the utilization of solar energy to aid and increase the rate of evaporation of sea water sprayed into the lower atmosphere adjacent the earth's surface wherein the water vapor content of the air is increased and the air is carried to a downwind mountain range and fresh water is released as orographic cumuliform precipitation.

Preferably, the sea water is sprayed into the lower atmosphere in a series of upwind parallel regions or bands generally oriented perpendicular to the prevailing wind direction and located at arid regions below sea level. The bands will preferably be of a configuration conforming to the geographic contours of the preselected downwind mountainous terrain, and the mountainous terrain, which will be used to provide the orographic lift, must have an elevation of several thousand feet above the elevation of the region at which the spraying of the atmosphere occurs. The resulting evaporation from subsequent downwind bands at which spraying occurs will add incrementally greater quantities of water vapor to the air, and also add a generous supply of condensation nuclei from the sea water evaporation process to the cumulatively increasing water vapor and nuclei content derived from preceding bands. While the atmospheric humidity increases to the predetermined design level, low-level prevailing winds will transport the water vapor laden air to the downward mountain range which will induce sufficient orographic lift to trigger convective and dynamic air mass instability and subsequent cumuliform precipitation.

Between the alternate spray bands or regions are nonspray bands or regions which permit the radiant energy of the sun and the ground to heat the moving air into which the water is being sprayed whereby the ability of the air to retain water vapor increases as the air moves toward the mountain at which precipitation will occur. As the air receives water vapor, its ability to absorb solar energy progressively increases in view of the increased water vapor content in the air and the increased heat absorption efficiency of the air imparted by the water vapor's ability to absorb radiant energy as a black body; thus, at each band region, progressively greater quantities of radiant energy are capable of being absorbed by the atmosphere than is being absorbed at the preceding bands or the air surrounding the overall treatment area itself. This increased radiant energy absorption efficiency provides the practical means for increasing the energy content of the modified air so that the meteorological parameter equivalent potential temperature of the modified air increases and thereby promotes convective air mass instability which is a prerequisite for triggering convective thunderstorm activity when the air mass is lifted orographically.

For the optimum practice of the invention there are several conditions which should be present in order to permit practical utilization of the inventive concept. These conditions are set forth below:

1. The region in which the invention is practiced should be an arid or other high insolation region having predominately clear skies during a major portion of the year in order to provide a relatively high level of incoming solar energy at approximately $2.25 \times 10^{12}$ calories per square mile per hour to $3.37 \times 10^{12}$ calories per square mile per hour one-half or three-quarters that of the Solar Constant of 2.00 calories per square centimeter per minute). 2. The local arid surface region in which spraying is to occur should be substantially below sea level. For instance, the invention could well be practiced in the area of the Dead Sea which is 1,286 feet below sea level, or in Death Valley, California, which is 276 feet below sea level. The purpose of employing the invention below sea level is to provide sufficient hydraulic head to permit the spraying of the sea water into the atmosphere to occur without requiring external energy systems to drive pumps or the like. 3. Lift producing means must be conveniently located with respect to the region defined above. As a matter of practical utilization, high mountains provide the best means for raising the treated air to a height which will produce precipitation. Preferably, the mountain used for orographic lift purposes should be higher than 3,000 to 5,000 feet, but hills or mountain ranges of much lower elevation may be used if other favorable physical conditions are present with respect to the natural water vapor content of the air, temperature, wind velocity, etc. The mountain ranges must be located downwind from the selected land regions at which spraying occurs, and may be 20 miles or so from the air treatment region, and the mountains provide an immediately available source of orographic lift to the moving high moisture content air mass boundary layer produced by the spraying and solar heating. 4. The prevailing winds over the spraying region and toward the mountain range producing orographic lift should be relatively low, such as in the range of 5 to 15 miles per hour at atmospheric levels below 3,000 to 5,000 feet, and under 15 to 25 miles per hour in the higher atmospheric layers to 10,000 feet levels. Moisture dispersion and diffusion rates at wind velocities greater than these levels, especially in the levels below 5,000 feet, may prevent the practice of the invention in that the ability of the air mass to effectively absorb sufficient solar heat to make the system practical might not be possible. The evaporation process will, however, tend to stabilize thermal wind velocities and thereby temper or reduce the wind speed across the spray regions and to the mountains. 5. It is desired that the natural water vapor content of the air being sprayed have a reasonably high level, such as from 3 to 10 grams of water per kilogram of dry air in the lower atmospheric regions. By having such a natural water vapor content the quantity of water that must be sprayed in the air is reduced, and the apparatus and expense of operation of the system is accord with the invention is reduced. This amount of natural water vapor is generally present, however, through out the world especially when the prevailing winds traverse large bodies of water, such as from the Mediterranean Sea, prior to passing over the arid sea level region. 6. Preferably, relatively hot arid surface temperatures should exist in the land region at which spraying occurs. For instance, degrees from at least 50° to 70° F. in winter and at least 65° to 95° F. in summer should prevail. These relatively high temperatures improve thermodynamic air mass properties that complement the operational success of the evaporative process occurring during the invention, for instance, the anhydrous capacity (low relative humidity) of air mass increases, which is the ability of the air mass to evaporate and absorb additional moisture. Additionally, the high temperature complements the adiabatic or evaporative cooling capacity of the air mass and thereby complements the degree to which the forced evaporation process occurring during the spraying can temper or lower the characteristic thermal wind velocities and ambient temperatures found in arid regions. Additionally, the angle lying between the dry adiabatic and saturation adiabatic lapse rates of the adiabatic chart becomes markedly divergent as a function of both higher ambient temperatures and absolute humidity, and this factor aids in producing conditions for absorbing and retaining water vapor. 7. For purposes of efficiency, and most effective operation, the spraying of the moisture into the air to produce a forced evaporative condition should occur at the time of maximum level of available solar radiant energy. Unlike a sea or other body of water, a force-sprayed evaporation system transforms radiant energy to latent heat of evaporation during the time of maximum radiant energy or the peak insolation period of the day. Though the reflectivity of a body of water is low at low angles of incidence, its transmissivity is very high in the characteristic solar radiant energy wavelengths. As a system for converting solar radiation to latent heat of evaporation on a real time basis, a body of water operates as a heat sink which recycles but once every 24 hours. For such purposes, it is not an efficient real time operational system and cannot be time phased to evaporate an optimum quantity of water into the atmosphere at the time of maximum solar insolation. In contrast, a force-sprayed sea water system can function on real time basis, and a concentrated region of water spray and resulting water vapor acts as a black body radiant absorptive system to most wavelength regions both solar and earth surface radiant.

There are a number of regions in the world in which the aforementioned physical requisites are present. For instance, in the southwestern parts of the United States there are arid desert regions below sea level, such as in Death Valley, which could practice the invention. Additionally, in the Dead Sea area adjacent Israel and Jordan the geographical terrain is such as to provide excellent means for practicing the invention. There are desert regions of western Australia which also appear to have physical characteristics in which the invention could be practiced. The island of Anegada, and the island of Malta also appear as possible locations for practicing the inventive concept. The Qattara Depression of northwestern Egypt also appears to have physical characteristics in which the invention could be practiced. However, there is a question as to whether sufficient mountain heights are available to provide the necessary orographic lift required in this particular area.

FIGS. 1 and 2 of the drawing illustrate a physical arrangement of spraying and nonspraying regions in accord with the practice of the invention. In these FIGS. an arid desert type land region is indicated at 10 which is preferably below sea level. The prevailing wind is indicated by the arrow 12 and the mountain range 14 exists downwind from the arid region a distance of 20 miles or so having an elevation preferably above 3,000 to 5,000 feet. A plurality of bands or regions 16 and 18 are defined on the arid region 10 in a manner as will be apparent in FIG. 2. These bands are preferably substantially parallel or concentric to each other, and are parallel or concentric with respect to the mountain range 14 which will be providing the orographic lift. The regions 16 are designated spraying regions or bands, and the regions 18 constitute solar-heating bands. The regions 16 and 18 may be of approximately equal width of about 1 mile with respect to the direction of prevailing winds as indicated by the arrow, and are perpendicularly related to the direction of prevailing winds. The exact width of regions 16 and 18 with respect to the direction of prevailing winds may vary considerably depending on the location of the installation and the local conditions, such as direction and velocity of prevailing winds, average temperatures and the like. In that a considerable number of factors are involved in determining the humidity, temperature and other physical characteristics present at any given time it is expected that a computer type evaluating system will have to be used to control the operation of the nozzles.

A plurality of water injection devices 20 such as nozzles mounted atop towers or high hills or the like are disposed in the regions 16 for spraying finely dispersed water droplets into the lower atmosphere, and these water spraying devices are connected to a supply source, not shown, supplying a control center 22 through conduits. The control center will likely include a computer system for analyzing the weather characteristics and determining optimum times and flow rates for operation of the spraying system. Under certain conditions it may be necessary only to operate a portion of the nozzles within spraying regions 16, or certain spraying bands or regions 16 may not be operated at all under natural high moisture content conditions.

A catch basin or reservoir system 24 of natural or manmade origin may be defined along the lower upwind side of the mountain range 14, or the precipitation occurring at the mountain range may merely be allowed to seep into a porous sand or ground in order to raise the water table level of the ground strata for recovery of the fresh water through wells. In that some rainfall may occur on the downwind side of the mountain range a catch basin may also be disposed on that side of the orographic lift producing region, if desired.

FIG. 3 illustrates the moisture diffusion distribution in the air as it travels over the spray and nonspray solar heating regions. The moisture diffusion curves indicated at 26 represent the diffusion of the water vapor introduced into the air and retained thereby during the evaporation process, and it will be noted that as the vertical lines 28 represent alternate spray and nonspray regions that it takes approximately five spray bands, or 10 miles, (though this distance will vary depending upon the prevailing wind velocity), for the water vapor to rise from the sea levels altitude to approximately 3,000 feet. As the curves show that the water vapor vertical diffusion rate decreases as it approaches the 3,000 foot level, the vertical rise of the curve can be expected to level out for relatively short distances of 10 to 30 miles.

Water may be provided for the control center 22 by means of an aquaduct, channel or other transport system which is capable of handling the vast quantities of water that will be necessary. In that the preferred arid region being sprayed is below sea level a reservoir would be employed at the point of use above the sea level elevation for supplying the water under high pressure to the control center.

As an example of a thermal budget summary which may occur at the region of the mountain 14 the cloud base may occur at 4,000 feet as indicated at 30. Air entering the foothills of the mountain at sea level at 60° F. cools at a dry adiabatic lapse rate of approximately −5.5° F. per 1,000 feet of elevation, and thus upon the air reaching the 4,000 foot cloud base level the temperature would be 38° F. As the air continues to move upwardly along the windward face of the mountain, the air cools at a moist adiabatic lapse rate above the 4,000 feet cloud base, at a rate of −3.2° F. per 1,000 feet of elevation, assuming precipitation is occurring. Assuming the mountain to be 10,000 feet tall the temperature of the air as it passes over the mountain would be 18.8° F. As the air passes over the mountain and descends on the opposite side it warms at a dry adiabatic lapse rate of 5.5° F per 1,000 feet, and will have a temperature of 73.8° F. at sea level. For any given region the average temperatures differ during the four seasons during the year, and thus the precipitation occurring at the mountain 14 during the varying seasons of the year will begin at various elevations as determined by the temperature water vapor, latent heat and other factors affecting the conditions at which precipitation will occur.

In general, unsaturated dry air of 20° C. ambient temperature cools approximately 2.8° C. for each 1,000 feet of lift through the lower layers of the atmosphere. Saturated wet air under these same conditions cools at the rate of 1.2° C. per 1,000 feet of lift. The latent heat of condensation energy stored in the water vapor is released in the condensation precipitation process and remains behind to heat the air column. The quantity of heat released approximates the difference between the 2.8° C. and the 1.2° C. lapse rates. The resulting maximum velocity induced to the resulting vertical air column is given by the equation $$V^2=2ah=2gh\Delta T/T$$

where $v$ = meters/second.

$\Delta T$ =°Abs. of vertical mean temperature differential between the cloud and adjacent air, and $T$ =°Abs. of mean moist adiabatic lapse rate temperature of the vertical column of moist air.

Ascending velocities vary greatly and range from 15 to 20 m.p.h. in rain shower cumulous to upwards of 75 m.p.h. in thunderstorms.

In the case of a high moisture content layer of air, such as that provided by the practice of the invention, the following comments apply with respect to this lower layer of air and the orographic lift it receives which will help in understanding the convective instability is a potential instability state existing in a layer of air. This instability generally cannot be released unless the layer is lifted by some external force, such as orographically. As a convective unstable layer is lifted, the lower portion becomes saturated and ascends moist adiabatically while the upper portion ascends dry adiabatically until its condensation level is reached. The process involves considerable mixing within the layers as the result of the vertical velocity resulting from the condensation heat released by the lower portion. This mixing causes an increase of the resulting adiabatic lapse rate until the upper portion becomes saturated. If, at the elevation where the upper portion of the layer becomes saturated, the resulting lapse rate is greater than the air mass surrounding, convective instability is released and overturning occurs. Once convective instability is released the moist column of air will continue to rise automatically and draw the surface level moist air into the rising vertical column of air. Thereafter, further orographic lift is not not required to maintain the instability system. Thus, the system will continue to function under its own power and release cumuloform rainfall to the desert below as long as surface or lower level moist air remains available in sufficient quantities to feed the system.

From the foregoing it will be appreciated that in view of the various factors which affect the production of rainfall, that computerized control of the apparatus for practicing the method of the invention provides the most practical means for providing efficient regulation and operation of the apparatus. Depending upon the moisture content of air, temperature, wind velocity, and other factors, it may not be necessary to operate the spraying nozzles in all of the bands available, and thus the most efficient utilization of sea water can be determined in accord with the varying weather conditions.

The diagram of FIG. 3 also includes information concerning the potential temperatures and humidity increase as air moves across the land region 10 and is alternately subjected to the water vapor increase occurring at bands 16, and the energy increase and temperature rise occuring at bands 18. The lower horizontal line which represents land level 10 with respect to the diffusion curves 26 is also indicated as line "A" and when so designated indicates a reference line indicating changes in relative humidity near the ground level of area 10. Lines 28 continue to indicate the boundaries of the regions 16 and 18. As the wind moves from the left to the right through the bands 16 and 18 it will be appreciated that the relative humidity sharply increases as the air travels over the spraying regions 16, and lowers as the air is heated as it passes over the regions 18. The increase in relative humidity at each band 16 is greater than the reduction in relative humidity occurring at the bands 18 which result in an overall increasing of the relative humidity as indicated by the line 30.

The horizontal line of FIG. 3 representing 1,000 feet is also designated reference line "B" to designate a temperature reference located near the ground level. The line 32 indicates the alternating increase and decrease in the ambient temperature of the air as it travels over the region 10, toward the lift producing region at the right.

In FIG. 3 the 2,000-foot reference line is also designated "C" for purposes of indicating a reference line with respect to the mixing ratio within the lower 3,000 feet elevation. This ratio is indicated by reference line 34 and it will be appreciated that this characteristic also increases as the air moves toward the lift producing the region.

In the previous description the introduction of the sea water into the air has been limited to a forced spray system. It is envisioned that other means for forcing high rates of sea water evaporation into the air could be utilized at the regions 16 other than spraying. For instance, a wick system could be utilized. Alternatively, experimentation has been successful in the field of increasing surface evaporation by the use of static electrical charges over a body of water to induce polarity effects, and with this type of an arrangement sea water could perhaps be introduced into the air using this polarity effect at the regions 16. It is also conceivable that a static field in combination with the spraying of the water into the air, as previously described, would have potential beneficial effects and advantages. Additionally, the use of sea water to wet sand regions could be used to increase the rate of evaporation, as when the spray system is in operation, although it is expected that such sand regions, without the spray region, would have to extend over considerably areas.

It is appreciated that modifications to the inventive concept may be apparent to those skilled in tee art, and it is intended that the invention be defined only by the scope of the following claims.

I Claim:

1. A method of producing fresh water by weather modification wherein a prevailing wind passes over a high solar-radiant energy flux region below sea level toward an orographic elevation such as a mountain having a height of least 1,000 feet comprising the steps of dividing the region windward of the mountain into a plurality of elongated bands of area substantially parallel to each other and disposed substantially perpendicular to the direction of the prevailing wind, and spraying sea water into the lower atmosphere at alternate bands of area to subject the air to alternate treatments of exposure to the sprayed sea water to increase the water vapor of the air and solar heating of the air to increase its ability to absorb water prior to its being lifted and adiabatically cooled by the mountain to produce precipitation.

2. In a method of producing fresh water by weather modification as in claim 1 wherein said bands of area are of a width having a constant ratio of width between the solar-heating band and the adjacent water spray band with respect to the direction of the prevailing wind.

3. In a method of producing fresh water by weather modification as in claim 2 wherein said bands are of a width of approximately 1 mile in the direction of the prevailing wind.

4. A method of producing fresh water by weather modification wherein a prevailing wind exists having a direction of movement over a high solar-radiant energy flux region toward an air current lift-producing region, comprising the steps of dividing the region windward of said air current lift-producing region into a plurality of longitudinal bands of area disposed substantially perpendicular to the direction of the prevailing wind and force introducing sea water into the lower atmosphere at alternate bands of area to subject the air to alternate treatments of exposure to the sea water to increase the water vapor content of the air and thereby increase the natural ability of the modified air to absorb radiant energy with increasing greater efficiency as a result of the added water vapor's ability to absorb radiant energy as a black body constituent of the modified air mixture and solar heating of the air to increase its ability to absorb additional quantities of water vapor and radiant energy prior to its being raised by the air current lift-producing region to produce precipitation.

5. A method of producing fresh water by weather modification wherein a prevailing wind exists having a direction of movement over a high solar-radiant energy flux region toward an air current lift-producing region, comprising the steps of dividing the region windward of said air current lift-producing region into a plurality of longitudinal bands of area disposed substantially perpendicular to the direction of the prevailing winds and forcibly spraying sea water into the lower atmosphere at alternate bands of area to subject the air to alternate treatments of exposure to the sprayed sea water to increase the water vapor content of the air and thereby increase the natural ability of the modified air to absorb radiant energy with increasing greater efficiency as a result of the added water vapor's ability to absorb radiant energy as a black body constituent of the modified air mixture and solar heating of the air to increase its ability to absorb additional quantities of water vapor and radiant energy prior to its being raised by the air current lift-producing region to produce precipitation.

6. A method of producing fresh water by weather modification wherein a prevailing wind exists having a direction of movement over a high solar-radiant energy flux region toward an air current lift-producing region comprising a high orographic elevation such as a mountain, comprising the steps of dividing the windward region of said high elevation into a plurality of longitudinal bands of area of generally parallel configuration disposed substantially perpendicular to the direction of the prevailing wind and forcing sea water into the atmosphere at alternate bands of area to subject the air to alternate treatments of exposure to the sea water to increase the water vapor content of the air and the quantity of solar energy absorbed by the air to increase its ambient temperature and reduce its relative humidity and thereby increase its ability to absorb increasing quantities of water vapor prior to its being lifted by the orographic elevation to produce convective air mass instability, cumuliform clouds and precipitation.

7. A method of producing fresh water by weather modification as in claim 5 wherein said bands of area are of a width having a substantially constant ratio of dimension between the solar-heating band and the adjacent water spray band with respect to the direction of the prevailing wind.